(12) United States Patent
Höhn (10) Patent No.: US 11,160,379 B2
(45) Date of Patent: Nov. 2, 2021

(54) BOOSTER SEAT AND METHOD FOR PRODUCING A BOOSTER SEAT

(71) Applicant: BF17 GmbH, Brunnthal (DE)

(72) Inventor: Wolfgang Höhn, Brunnthal (DE)

(73) Assignee: BF17 GmbH, Brunnthal (DE)

( * ) Notice: Subject to any disclaimer, the term of this patent is extended or adjusted under 35 U.S.C. 154(b) by 0 days.

(21) Appl. No.: 16/467,905

(22) PCT Filed: Dec. 8, 2017

(86) PCT No.: PCT/EP2017/082032
§ 371 (c)(1),
(2) Date: Jun. 7, 2019

(87) PCT Pub. No.: WO2018/104520
PCT Pub. Date: Jun. 14, 2018

(65) Prior Publication Data
US 2019/0365103 A1  Dec. 5, 2019

(30) Foreign Application Priority Data
Dec. 9, 2016  (DE) ..................... 10 2016 123 944.5

(51) Int. Cl.
*A47C 3/04* (2006.01)
*A47C 5/12* (2006.01)
(Continued)

(52) U.S. Cl.
CPC .................. *A47C 3/04* (2013.01); *A47C 5/12* (2013.01); *A47D 1/103* (2013.01);
(Continued)

(58) Field of Classification Search
None
See application file for complete search history.

(56) References Cited

U.S. PATENT DOCUMENTS

| 587,845 | A | * | 8/1897 | Mitchell | ................. A47D 1/10 |
| | | | | | 297/130 |
| 3,596,986 | A | * | 8/1971 | Ragsdale | ............. B60N 2/2863 |
| | | | | | 297/183.6 |

(Continued)

FOREIGN PATENT DOCUMENTS

| DE | 7632012 U | 2/1977 |
| DE | 4105618 A1 | 2/1992 |

(Continued)

OTHER PUBLICATIONS

European Patent Office, Transmittal of the International Search Report and Written Opinion issued in International Application No. PCT/EP2017/082032, dated Apr. 23, 2018, 21 pp.

(Continued)

*Primary Examiner* — David R Dunn
*Assistant Examiner* — Christopher E Veraa
(74) *Attorney, Agent, or Firm* — Fitch, Even, Tabin & Flannery LLP (57) ABSTRACT

The present invention relates to a booster seat comprising a seat shell with a lower face for supporting the seat shell and an upper face, on which a seat base and lateral seat cushion regions and backrest regions that delimit the seat base laterally and rearwards are provided. The lower face of the seat shell has a stacking contour which is designed to provide a stacking capability on the upper face of the seat shell. The invention also relates to a booster seat comprising a strap system that has four eyelets, wherein one retaining strap is allocated to a pair of eyelets. Two eyelets are arranged in the front outer region of each lateral seat cushion region, while two eyelets are arranged in the rear outer region of each lateral seat cushion region or in the lateral outer region of the back region. The invention further relates to a method for producing a booster seat of this type.

15 Claims, 5 Drawing Sheets

(51) Int. Cl.
*A47D 1/10* (2006.01)
*B29C 44/12* (2006.01)
*B29C 44/58* (2006.01)
*B29K 75/00* (2006.01)

(52) U.S. Cl.
CPC ........ *B29C 44/1214* (2013.01); *B29C 44/588* (2013.01); *B29K 2075/02* (2013.01)

(56) References Cited

U.S. PATENT DOCUMENTS

| | | | |
|---|---|---|---|
| 3,604,749 A | 9/1971 | Parmett | |
| 4,798,412 A * | 1/1989 | Kohus | A47D 1/004 297/256.11 |
| 4,854,638 A * | 8/1989 | Marcus | A47D 1/103 297/256.11 |
| 7,011,368 B2 | 3/2006 | Barth | |
| 2004/0084938 A1* | 5/2004 | Tomas | A47D 1/004 297/250.1 |
| 2008/0191530 A1 | 8/2008 | Basham | |
| 2009/0001776 A1* | 1/2009 | Bearup | A47D 1/004 297/153 |
| 2011/0181084 A1* | 7/2011 | Arnold, IV | A47D 15/006 297/256.16 |
| 2012/0104816 A1 | 5/2012 | Flannery | |
| 2013/0022391 A1* | 1/2013 | Fisher, Jr. | B29C 43/18 403/265 |
| 2014/0368004 A1* | 12/2014 | Sclare | A47D 1/10 297/135 |
| 2015/0351558 A1* | 12/2015 | Visser | A47D 15/006 297/174 R |
| 2018/0352969 A1* | 12/2018 | Yu | A47D 1/00 |

FOREIGN PATENT DOCUMENTS

| | | |
|---|---|---|
| DE | 19636814 A1 | 3/1998 |
| DE | 102004045757 A1 | 4/2006 |
| DE | 102007061004 A1 | 6/2009 |
| DE | 102011016196 B4 | 12/2011 |
| EP | 2163173 A1 | 3/2010 |
| EP | 2305075 A1 | 4/2011 |
| WO | 0065965 | 11/2000 |
| WO | 2008117039 A1 | 10/2008 |
| WO | 2009004371 A1 | 1/2009 |

OTHER PUBLICATIONS

European Patent Office, International Preliminary Report on Patentability and Written Opinion issued in International Application No. PCT/EP2017/082032, dated Jun. 20, 2019, 12 pp. (English Translation).

* cited by examiner

BOOSTER SEAT AND METHOD FOR PRODUCING A BOOSTER SEAT

CROSS-REFERENCE TO RELATED APPLICATIONS

This application is a U.S. national phase application filed under 35 U.S.C. § 371 of International Application PCT/EP2017/082032, filed Dec. 8, 2017, designating the United States, which claims the benefit of German Patent Application 10 2016 123 944.5, filed Dec. 9, 2016, both of which are hereby incorporated herein by reference in their entirety.

The present invention relates to a booster seat including a seat shell comprising a bottom side for supporting the seat shell on a seat and a top side, on which a seating surface as well as sidewall and backrest areas laterally and rearward bounding it are provided. Furthermore, it relates to a booster seat including a seat shell comprising a bottom side for supporting the seat shell on a seat and a top side, on which a seating surface as well as sidewall and back areas laterally and rearward bounding it are provided, as well as at least a first belt system for fixing the seat shell to the seat. Finally, the present invention relates to a method for producing a booster seat.

Figure 1:
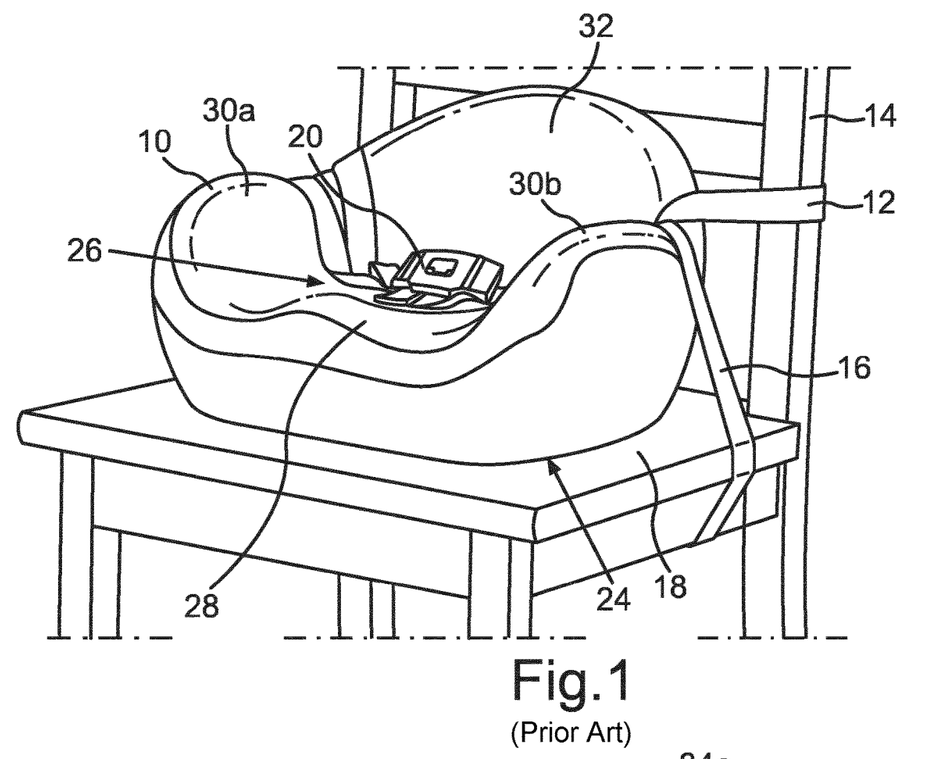
FIG. 1 a view of a first example of a booster seat known from the prior art.

There are different manners of allowing infants eating at the family table. Instead of a high chair, a booster seat is often used, which is fixed to a chair for adults and decreases the distance of the seating surface to the table top. In this context, the standard E DIN EN 16120 specifies the safety requirements to and the corresponding test methods for booster seats for chairs, which are intended for infants, who can sit without support, up to an age of three years or a maximum body weight of 15 kg. The last version of this standard bears the designation EN 16120: 2012+A1: 2014. Herein, it is specified among other things that the booster seat is to be fixed onto or to the chair at its seatback and its seating surface. Furthermore, a three-point retaining belt is to be provided on the booster seat. In this context, FIG. 1 shows a booster seat 10 known from the prior art under the designation "Keekaroo Cafe Booster", which includes a first retaining belt 12 for fixing the booster seat 10 to a chairback 14. Moreover, it comprises a second retaining belt 16 to fix the booster seat 10 onto the seating surface of a chair 18. Moreover, a three-point retaining belt 20 for retaining the infant in the booster seat 10 is provided. The retaining belts 12, 16 are formed such that the belt end is to be threaded through a belt buckle for closing the retaining belt with adjustment of a suitable belt length. The belt buckle of the retaining belt 12 is located on the backside of the chairback 14, while the belt buckle of the retaining belt 16 is located on the bottom side of the seating surface 18. The booster seat 10 includes a seat shell 22, which comprises a bottom side 24 for supporting the seat shell 22 on a seat, in particular a chair, and a top side 26, on which a seating surface 28 as well as sidewall areas 30a, 30b laterally bounding it as well as a rearward bounding backrest area 32 are provided.

Figure 2:
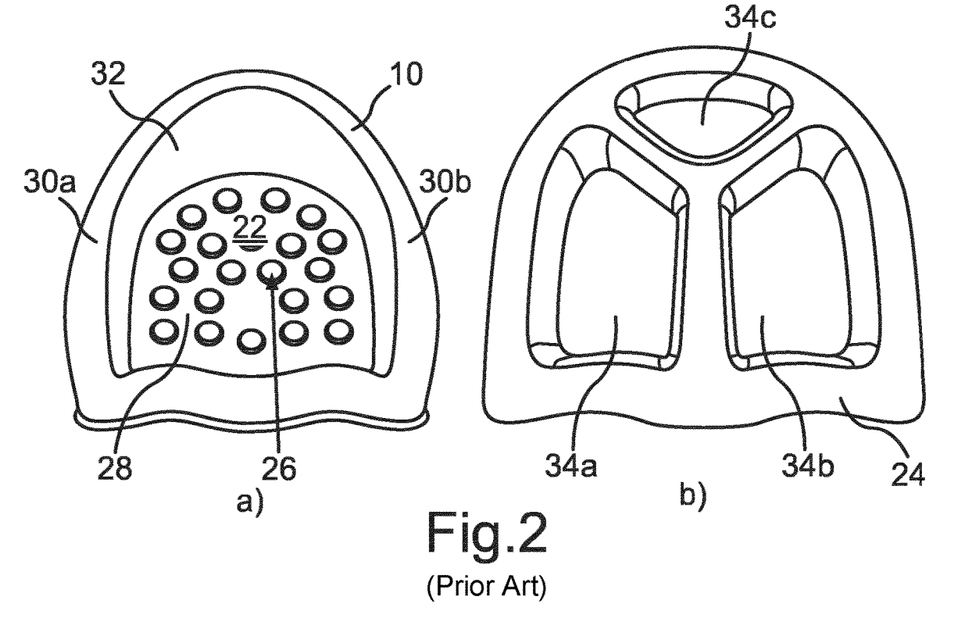
FIG. 2 a second example of a booster seat known from the prior art in top view (FIG. 2*a*) as well as in bottom view (FIG. 2*b*)

FIG. 2 shows a booster seat 10 known from the prior art under the designation "BabySmart Cooshee Booster Hyback", which is allowed to be employed for children, who are older than 36 months, because the above mentioned DIN standard is then no longer relevant. This booster seat 10 also comprises sidewall areas 30a, 30b as well as a seat shell 22 with a seating surface 26. Further components, which correspond to those of FIG. 1, are identified with the same reference characters. FIG. 2a shows a top view to the booster seat 10, while FIG. 2b shows a bottom view of the booster seat 10. The bottom side 24 of the booster seat 10 comprises three recesses 34a, 34b and 34c. Thereby, the weight of the booster seat 10 can be reduced and the material cost can be lowered.

Without the use of child's chairs or booster seats, there is the risk that infants topple from seats not adapted to them and thereby injure themselves. In particular in the hotel and gastronomy area, i.e. in public eateries, booster seats are often not provided in sufficient number.

From U.S. Pat. No. 7,011,368 B2, a child retaining device for use with airplane seats is known. It includes a shell-shaped body, into which a bottom and sidewalls are integrally formed. As is in particular well apparent in FIG. 3 of the mentioned printed matter, in a use position of the child retaining device, an infant can occupy a safe, lying position in transport thereof in an airplane. The child retaining device comprises passage openings for the seat belt of the actual airplane seats in its bottom section and thus can be attached to an airplane seat.

From DE 10 2011 016 196 B4, a child's safety seat is known, which includes a seat shell with a top side and an opposite bottom side as well as two armrests, which include upward protruding and respectively obliquely extending inner surfaces and obliquely extending outer surfaces on the left and right side of the seat shell, respectively, wherein the top side of the seat shell is provided with at least one elevation and the bottom side comprises at least one area recessed on one side, i.e. an open—in contrast to an enclosed—recess, which respectively corresponds to the position of the elevation, wherein the area recessed on one side has a shape, which is adapted such that it coincides with the shape of the elevation. If a first such child's safety seat is stacked on a second such child's safety seat, the obliquely extending outer surfaces of the armrests of the first child's safety seat form a transitional fit with the obliquely extending inner surfaces of the armrests of the second child's safety seat. Sufficient stability in stacking is thereby achieved by cooperation of two measures: firstly, two elevations of a first seat engage with two open recesses of a second child's seat, and secondly, the two armrests of a first child's seat support on the two armrests of a second child's seat. However, in booster seats for infants, it is not possible to form the armrests as in the mentioned printed matter since an infant would thereby not sufficiently stably sit in the booster seat. Moreover, such a child's safety seat does not comprise a backrest or back area and therefore is not employable with infants for this reason too.

From US 2008/0191530 A1, a booster seat is known, but which does not comprise sidewall areas and a backrest or back area.

Therefore, the object of the present invention is in developing generic booster seats such that reduction of the number of injuries of infants by accidents in sitting is allowed. Furthermore, the object is in providing a method for producing a corresponding booster seat.

A first aspect of the present invention is based on the realization that sufficient booster seats for infants are often not provided in eateries because they require too much storage space. If known booster seats for infants are stacked on top of each other, the stack is unstable and may be knocked over. Accordingly, the storage surface required for a number n of booster seats is substantially n times the base surface, i.e. the surface of the bottom side, of a booster seat.

In order to reduce the required footprint for storing a plurality of booster seats for infants, it is provided according to this first aspect of the present invention that the bottom side of the seat shell has a stacking contour, which is adapted for providing a stacking ability onto the top side of the seat shell. In this manner, a plurality of booster seats according to the invention can be stacked partially into each other and on top of each other to a stable stack, wherein the footprint required thereto is only the base surface of the bottom side of a single booster seat. In that each two booster seats are partially stacked into each other, the entire height for a preset number of booster seats according to the invention is also minimal. In this manner, the space between floor and ceiling of a storage room for storing booster seats according to the invention can be optimally utilized. In an embodiment of the present invention, about 20 booster seats according to the invention can be stacked on a set-up area of 80 cm×80 cm. in this manner, a great number of booster seats for infants can be provided even in eateries with limited space with lowest possible set-up area such that they can be provided to virtually each infant requiring such a booster seat.

Thereby, the number of seating accidents and thereby the number of injuries of infants can be significantly reduced. If one considers that an infant without booster seat falls a distance of about 90 cm (head height) from the seating surface of a normal chair intended for an adult or a booster seat intended for a larger child, and the floor in public eateries is often designed as a tile floor, the potential of the present invention becomes clear.

Within the scope of the present invention, the term "backrest area", refers to an area which supports the back of an occupant of the seat shell, in particular extends higher in a vertical direction than the corresponding side plates in use position of the booster seat. In contrast, the term "back area" denotes that the area does not necessarily have to be formed such that it supports the back of an occupant. Rather, it can also only serve to rearwardly support the posterior of the occupant. Therefore, a back area may be formed as high as the side plates or even slightly lower.

In the booster seats according to the invention presented below, the side plates and backrest areas or back areas can be configured separated from each other, but they can also, which is preferred, transition into each other. The side plate areas serve as the arm support of the infant, while the backrest area or the back area serves as supporting the back and the posterior, respectively, of the infant.

Preferably, the seating surface is horizontally oriented in a use position of the booster seat, wherein the term "horizontal" includes deviations caused by manufacturing tolerances from a state of "exactly horizontal" of up to ±4 degrees in terms of the present invention. The term "horizontal" is clear if the seating surface is flatly formed. However, according to the invention, seating surfaces are also encompassed, which are for example formed structured, in particular for example comprising formations for thighs and/or posterior. In terms of the present invention, the term "horizontal" then relates to the extension of the posterior and/or thigh support from the backrest area or back area to the front edge of the booster seat.

Preferably, the seating surface forms a right angle with the side plate area and/or the backrest or back area—except for rounded transitional areas. The designation "right angle" includes deviations due to manufacturing tolerances of up to ±5°

Thus, a backrest is correspondingly arranged in the backrest area of the top side, and a sidewall area is respectively arranged in the respective side plate areas of the top side. Therein, the backrest as well as the respective sidewalls can be formed as corresponding upward protrusions with respect to the seating surface. Therein, the backrest and the respective sidewalls, as already described, can furthermore be formed as a single common upward protrusion, in particular as a U-shaped protrusion with respect to the seating surface. However, the backrest and the respective sidewalls can also be formed separated from each other such that the backrest and a respective sidewalls are each formed as a single upward protrusion with respect to the seating surface. Correspondingly, a respective depression can then be arranged between a respective sidewall and the backrest, that is in an intermediate area located between the respective sidewalls and the backrest. This depression between a respective sidewall and the backrest can extend up to the height of the seating surface or also be formed raised with respect to the seating surface, but depressed with respect to the respective highest points of the sidewalls and the backrest. Corresponding to these individual areas of the top side, namely the area of the seating surface, the backrest area, the respective sidewall areas and the optionally additional intermediate areas, which can be located between the respective sidewall area and the backrest area, the bottom side of the seat shell can also be divided into corresponding areas. Thus, the seating surface area of the bottom side for example relates to that area of the bottom side, which is arranged opposing the seating surface of the top side. Correspondingly, the backrest area of the bottom side denotes that area of the bottom side, which is arranged opposing the backrest area of the top side. A respective sidewall area of the bottom side denotes the respective two areas of the bottom side, which are arranged opposing the respective sidewall area of the top side. For example, if the walls and the backrest are formed as a continuous protrusion of the top side of the seat shell, in particular U-shaped, the backrest area and the sidewalls of the bottom side taken together also form a U-shaped area of the bottom side of the seat shell. However, the backrest and the respective sidewalls can also be formed separated from each other. Correspondingly, a first intermediate area is located between a first sidewall and the backrest and a second intermediate area is located between a second sidewall and the backrest. A first and a second intermediate area of the bottom side, respectively, then denotes those areas of the bottom side, which are arranged opposing the first and the second intermediate area of the top side. The sidewalls, the backrest area, and the intermediate areas of the bottom side located between can then also define a U-shaped area of the bottom side. The bottom side of the seat shell can for example be formed of the seating surface area and a U-shaped area, which in turn is composed of the backrest area, the respective sidewall areas and optionally the respective intermediate areas.

Therein, it is in particular advantageous if the bottom side comprises at least one enclosed recess, which is only arranged in the backrest area and/or in the respective sidewall and which is formed to at least partially receive a backrest area and/or a respective sidewall of a further booster seat of the same type in stacking. In case the backrest is formed separated from the respective sidewalls, the bottom side can comprise three such enclosed recesses, wherein a respective one of these recesses is arranged in the backrest area and in the respective sidewall of the bottom side. However, only one enclosed recess would also be conceivable on the bottom side in this example, which is for example only arranged in the backrest area. This too allows stacking, since the backrest is preferably formed higher than the respective sidewalls relative to the seating surface. However, this at least one enclosed recess can also be formed as a single U-shaped recess on the bottom side, which includes the backrest area as well as the respective sidewalls of the bottom side. If the backrest is again formed separated from the sidewalls, the U-shaped recess on the bottom side additionally also includes the intermediate areas between the respective sidewall areas and the backrest area. If the backrest and the respective sidewalls are formed as a common protrusion without intermediate areas, this U-shaped enclosed recess on the bottom side correspondingly includes only the backrest area and the respective sidewalls areas.

These formations have the great advantage that increased stability of the booster seat in positioning the booster seat on a seat such as for example a chair results by such a configuration of the at least one enclosed recess on the bottom side, which does not extend across the entire bottom side of the seat shell, but which is limited to a partial area of the bottom side, and therein the stacking ability remains by the at least one recess on the bottom side at the same time. Therein, the enclosed recess preferably extends across less than half of the surface of the bottom side. Moreover, the bottom side can also comprise multiple recesses separated from each other, which are then correspondingly separated from each other by material webs. In this case too, a respective enclosed recess therein extends across less than half of the surface of the bottom side. Hereby too, increased stability in positioning the booster seat on a seat can be provided. For example, if the edge of the bottom side of the seat shell slips beyond one on the seat, thus, the danger of tilt of the booster seat can still be reduced to a minimum since the at least one recess does not extend across the entire bottom side, but only a partial area thereof, which is less than half of the bottom side. Furthermore, it is preferred that the edge enclosing the at least one recess as part of the bottom side has a width of at least 3 cm, preferably at least 5 cm. Correspondingly, the edge area of the bottom side adjoining to the contour bounding the bottom side and in particular forming the boundary between bottom side and top side, also has a width of at least 3 cm, preferably at least 5 cm.

Furthermore, it is preferred that the edge of the at least one enclosed recess, in particular also the respective edges in case of multiple recesses in the bottom side, in particular the edges of all of the recesses provided in the bottom side, are located in one plane. Hereby too, more stability can be provided.

Moreover, the seat shell is preferably formed such that a center of gravity of the seat shell is arranged such that an overall center of gravity of seat shell and a child sitting on the seating surface is arranged in a central area of the seat shell. Preferably, the center of gravity of the seat shell is in a half including the backrest area in plain view to the top side of the seat shell, but in an area of this half of the seat shell different from the backrest area itself, and between the bottom side and the top side of the seat shell. Furthermore, the center of gravity of the seat shell is equally far apart from the respective sidewalls. In addition, the center of gravity is preferably in an area different from the backrest area and the sidewall areas as well as the optional intermediate areas related to a plane elevated with respect to the bottom side. In other words, thus, the center of gravity is in the seating surface area between top and bottom side of the seat shell, in particular central with respect to the seating surface area or between the center of the seating surface area and the backrest area. Hereby, particularly high stability in sitting can be achieved. In addition, by the arrangement of a material center of gravity in this area, deflection of the seating surface towards the bottom side can be prevented or at least reduced. In particular, material, i.e. not the at least one recess, is in an area of the seat shell including the center of gravity. In other words, the at least one recess, in particular each recess, which the seat shell comprises, is arranged in an area of the seat shell which is different from the area of the seat shell including the center of gravity.

In a preferred embodiment, the bottom side comprises a first enclosed recess in the backrest area, which is formed to at least partially receive a backrest area of a further booster seat of the same type in stacking. Moreover, the bottom side can comprise a second enclosed recess in the respective sidewall area, which is formed to at least partially receive the respective sidewall area of a further booster seat of the same type in stacking. In this manner, a second booster seat disposed above a first booster seat is supported over at least three areas and thus in stable manner and without the risk of tilting. Preferably, the recesses are matched to the back or backrest area and the sidewall areas such that the orientation in the space of the second booster seat stacked above a first booster seat corresponds to the orientation of the first booster seat in the space. According to this principle, a plurality of such booster seats can accordingly be stacked above each other, whereby a substantially perpendicular stack results. In contrast to a one-sided, open recess, an enclosed recess only opened in one spatial direction, allows locking a second booster seat arranged above a first one and therefore results in a particularly stable stack.

Preferably, the first enclosed recess and the second enclosed recesses are formed as a common enclosed recess. In this manner, the stackability can be provided with high safety with reduced material demand for the booster seat. Moreover, the weight of a booster seat according to the invention can hereby be reduced.

By providing corresponding retaining belts, such a booster seat can be formed for use for infants below 36 months, as well as also for infants above 36 months, in whom retaining belts can be omitted.

A second aspect of the present invention is based on the realization that present booster seats for infants below 36 months often are not properly used since the operation thereof is sophisticated, in particular time-consuming, and thereby too user-unfriendly. An analysis of the booster seat illustrated in FIG. 1 yields the result that young mothers, who often still suffer from injuries resulting from the birth process on the one hand and/or increased weight on the other hand, take little pleasure in the circumstance that the mechanism for fixing the booster seat and for correctly adjusting the belt length, respectively, is to be operated on the poorly accessible bottom side of the seating surface of the chair. The adjustment and fixing of the belts is thus effected below the chair. Thereto, the user has to get on his knees and look below the seating surface. As long as the booster seat is not yet fixed to the seating surface of the chair, the chair cannot be turned upside-down to allow better accessibility to the belt buckle. In the fixing mechanism illustrated in FIG. 1, the end of a retaining belt has to be virtually blindly threaded into a corresponding belt loop below the seating surface of the chair.

The present invention is further based on the realization that the frequency of the use of booster seats for infants below 36 months can be increased if the closure mechanism for fixing the booster seat to the seating surface of a chair is moved to an area which can be well seen by a person who stands in front of the chair. In the non-visible area, only passing a retaining belt below the seating surface then occurs. Continuous sight to the retaining belt is not required. Closing the retaining belt, in particular in the length suitable for fixing the booster seat, then occurs in the well accessible and readily visible area.

In order to allow this, in a booster seat according to the invention according to this second aspect, the first belt system includes a first, a second, a third and a fourth eyelet with respective retaining web as well as a first and a second retaining belt, wherein the first and the second eyelet are associated with the first retaining belt and the third and the fourth eyelet are associated with the second retaining belt, wherein the first and the second eyelet are arranged in the front exterior area of the respective sidewalls, wherein the third and the fourth eyelet are arranged in the rear exterior area of the respective sidewalls or in the lateral exterior area of the back area.

Preferably, the respective retaining web is further used to fix the respective eyelet in the negative mold in foaming the booster seat. Thereby, a dual function of the respective retaining web results.

With respect to the stability, it is preferred if the first and the second eyelet are arranged in the front half of the exterior area, in particular in the front third of the exterior area. Correspondingly, the third and the fourth eyelet are preferably arranged in the rear half of the exterior area of the respective sidewalls, in particular in the rear third of the exterior area of the respective sidewalls. Alternatively, the arrangement of the third and the fourth eyelet preferably occurs in the respective outer third of the exterior area of the back area.

Furthermore, it is preferred if the first and the second eyelet and/or the third and the fourth eyelet are arranged in the respective lower half of their respective areas. In this manner, a particularly good and stable fixing to the seating surface and seatback, respectively, can be achieved.

In this context, the first and the second eyelet are arranged such that the respective retaining web is horizontally oriented in the position of use of the booster seat, and the third eyelet and the fourth eyelet are arranged such that the respective retaining web is vertically oriented in the position of use of the booster seat. In this manner, orientation of the respective retaining belt is effected perpendicular to the orientation of the respective retaining web, whereby very stable fixings are allowed with regard to movements of the infant positioned in the booster seat.

It has proven advantageous if the respective eyelet includes an eyelet trough with a round interior area. This allows a particularly simple threading of the corresponding retaining belt to guide it around the associated retaining web. Further preferably, the outer contour of the circumference of the respective eyelet does not have corners. It is in particular formed round, oval or elliptical. In this manner, inadvertent catching of a passerby, which could result in detaching or loosening of the eyelet, is reliably prevented.

Preferably, the seat shell is formed as a foamed molded part, in which the respective eyelets are accommodated, wherein each eyelet comprises a web, which is coupled to the eyelet trough on one side and to a retaining anchor for retaining the eyelet in the foamed molded part on the other side.

Preferably, a booster seat according to the invention is produced from polyurethane. Polyurethane is characterized by a very good feel, low maintenance requirements, as well as excellent resilience such that a risk of injury is minimized. In this context, it has proven particularly advantageous if the polyurethane surface is varnished with a varnish resistant to UV radiation. Since booster seats according to the invention are configured for infants, the attractiveness thereof can be favored by colorful formation. Varnishing with a varnish resistant to UV radiation reliably prevents fading of the bright colors and thereby maintains the attractiveness of such booster seats over a long period of time.

By the use of a retaining anchor, fixing the eyelet in the foamed molded part can be achieved. By providing a web arranged between an eyelet and a retaining anchor, fixing the eyelet in the "depths" of the booster seat, i.e. as far away from the outer boundary as possible, and thereby particularly reliable fixing is achieved. In this manner, almost the entire material thickness in the corresponding sidewall or back area or backrest area can be used for fixing.

Preferably, the web comprises a plurality of individual webs, which are supported on the eyelet. Preferably, at least two of the individual webs are spatially differently oriented to particularly reliably protect the eyelet against relative movements to the foamed molded part.

In order to prevent pullout of the eyelets and damage to the eyelets, respectively, by careless handling of a booster seat according to the invention, it can be provided that the respective eyelet along with web and retaining anchor is positively accommodated in the foamed molded part. Thereby, the eyelet does not or barely protrudes beyond the contour of the booster seat and accordingly offers little, in particular no contact surface.

In a preferred embodiment, the respective retaining anchor is formed wave-shaped in cross-section. Thereby, it is achieved that the retaining anchor can uniformly distribute the tensile force on the surrounding material of the foamed molded part upon tensile stress, and in particular is stressed in the transitional areas from the retaining anchor to the foamed molded part as little as possible. Thereby, premature wear of the fixing of the retaining anchor in the foamed molded part and thereby pullout of the eyelet itself can be reliably prevented even with high stress in permanent use.

Moreover, the respective retaining anchor can comprise at least one slot, which extends parallel to the respective retaining web, and/or at least one passage opening. Since this at least one slot and/or this at least one passage opening is filled with material of the foamed molded part in foaming the foamed molded part, the fixing of the retaining anchor in the foamed molded part can hereby be further improved.

Preferably, the first and the second retaining belt comprise a hook and loop (such as Velcro™) fastener. Thereby, the belt end can be particularly easily passed around the retaining web of the respective eyelet and subsequently fixed. In contrast to fixing of a retaining belt in a belt buckle, in which the belt buckle has to be matched to the dimensions of the retaining belt for fixing, the eyelet along with eyelet trough and retaining web can have very much larger dimensions than the width of the retaining belt in the present invention. In this manner, the fixing of a booster seat according to the invention is possible in a particularly user-friendly manner.

According to a preferred embodiment, the bottom side of the seat comprises at least a first recess for receiving the first retaining belt and a second recess for receiving the second retaining belt. In this manner, the retaining belts associated with a respective booster seat are reliably coupled to the respective booster seat upon non-use—which is of importance in particular in transport of the booster seat—without impairing the optionally additionally provided stackability and without the risk that a passing person accidentally gets caught on a retaining belt. Accordingly, they are not tidied up in disturbing manner and are quickly available for the next employment.

According to a preferred development, the first recess comprises a first clamping device for clamping the first retaining belt and the second recess comprises a second clamping device for clamping the second retaining belt.

Thereby, fixing the retaining belts is allowed without a mechanically movable part. Since each mechanical part has to be serviced, high reliability with lowest maintenance requirement is thereby allowed.

In this context, it is particularly advantageous if the booster seat is formed as a foamed molded part, wherein the first and the second clamping device are molded into the foamed molded part, i.e. in the negative mold. In this manner, the clamping devices can be particularly inexpensively produced since they are generated in foaming the molded part in one operation without further effort. By forming the clamping devices from the material of the foamed molded part, elasticity of the clamping device is moreover provided, which ensures particularly reliable fixing of the retaining belts.

In this context, it is particularly preferred if the first and the second clamping device each include at least one first area with a first width and at least one second area with a second width, wherein the first width is larger than the second width. Thereby, the area with the second width can serve for reliably fixing an in particular folded retaining belt, while the area with first width only receives the retaining belt without fixing it in slip-proof manner. In this manner, the respective retaining belt can be particularly simply introduced into the clamping device and again be removed from it.

In this context, it is even more advantageous if the transitional area from a first area to a second area is rounded. Hereby, introduction of the retaining belt into the clamping device is facilitated once again.

Preferably, the first recess provided for receiving the first retaining belt and the second recess provided for receiving the second retaining belt are formed as a common recess.

Thereby, a reduction of material can be achieved, which results in a particularly low weight of such a booster seat. Furthermore, the effort in producing the negative mold thereby decreases.

In order to allow the employment of such a booster seat for children below 36 months, a second belt system for retaining an occupant in the seat shell can further be provided. It is preferably configured as a three-point retaining belt.

The preferred embodiments presented with respect to the booster seat according to a first aspect of the present invention and the advantages thereof correspondingly apply to the booster seat presented with respect to a second aspect of the present invention and vice versa. Furthermore, the embodiments presented with respect to the booster seats according to the invention and the advantages thereof apply to the method according to the invention for producing a booster seat. Therein, a negative mold of a seat shell is first provided, which comprises a bottom side for supporting the seat shell and a top side, on which a seating surface as well as sidewall and back areas laterally and rearward bounding it are provided. Subsequently, a first and a second eyelet each with a retaining web are positioned in the front exterior area of the respective sidewall area relative to the negative mold, in particular in the negative mold, as well as a third and a fourth eyelet each with a retaining web are positioned in the rear exterior area of the respective sidewall area or in the lateral exterior area of the back area relative to the negative mold, in particular in the negative mold. Subsequently, a plastic foam, preferably polyurethane, is filled into the negative mold for forming the seat shell and fixing the first, the second, the third and the fourth eyelet.

Moreover, the negative mold is preferably configured as two parts. Thus, the negative mold can preferably comprise a first mold part and a second mold part, wherein the first mold part corresponds to a top side of the booster seat, in particular the seat shell, and wherein the second mold part corresponds to the bottom side of the booster seat and the seat shell, respectively. In filling the plastic, in particular the polyurethane, the negative mold is arranged such that the first mold part is below the second mold part with respect to a direction of gravity. As for example described with respect to the booster seats according to the invention and their configurations, it is advantageous to provide at least one recess in the bottom side of the seat shell. For this purpose, the second mold part can be formed with at least one corresponding depression to provide the at least one recess in the bottom side of the seat shell. Correspondingly, the second mold part can be formed thicker in the area of this at least one depression than at another location. Furthermore, it is particularly advantageous if the second mold part comprises multiple vents, in particular in the form of holes or channels. Therein, these vents are further preferably arranged in an area of the second mold part, which is different from the areas of the second mold part forming the at least one recess in the bottom side of the seat shell. Preferably, numerous such vents are introduced into the second mold part, such as for example more than 10, preferably also more than 20, for example 23 or 24. Therein, the arrangement of these vents has the great advantage that they are thus arranged in a highest area of the negative mold with respect to the direction of the gravitational force in the assembled state of first and second mold part during the process, whereby the air or the gas, which has to escape from the negative mold during foaming the plastic, can as completely escape as possible as well without therein forming gas bubbles in the plastic. By such air residues or gas bubbles, unpleasant formations and holes can arise in the seat, which thus can advantageously be avoided. In addition, by this arrangement of the vents, it can further be ensured that the channels from the interior area of the negative mold, i.e. in the closed state of the negative mold, up to the outer side located on the side of the second mold part can be configured extremely short, since they are located in the thin and not in the thick area of the second mold part, which provides the at least one depression for the at least one recess in the bottom side of the seat shell. The risk of occlusion of the channels can thereby be advantageously reduced and the formation of unpleasant gas bubbles can again be avoided.

In the following, embodiments of the present invention are now described in more detail with reference to the attached drawings. They show:

FIG. 3 an embodiment of a booster seat according to the invention in perspective view (FIG. 3*a*), in top view (FIG. 3*b*), in bottom view (FIG. 3*c*), in side view (FIG. 3*d*) and in top view (FIG. 3*e*) corresponding to FIG. 3*b* with mounted three-point belt;

FIG. 8 a schematic representation of two booster seats according to the invention stacked on top of each other in a view obliquely from behind (FIG. 8*a*) and obliquely from the front (FIG. 8*b*)

The reference characters introduced with reference to FIGS. 1 and 2 are further used in the further figures for identical and identically acting components and members.

Figures 3A, 3B, 3C, 3D, 3E:
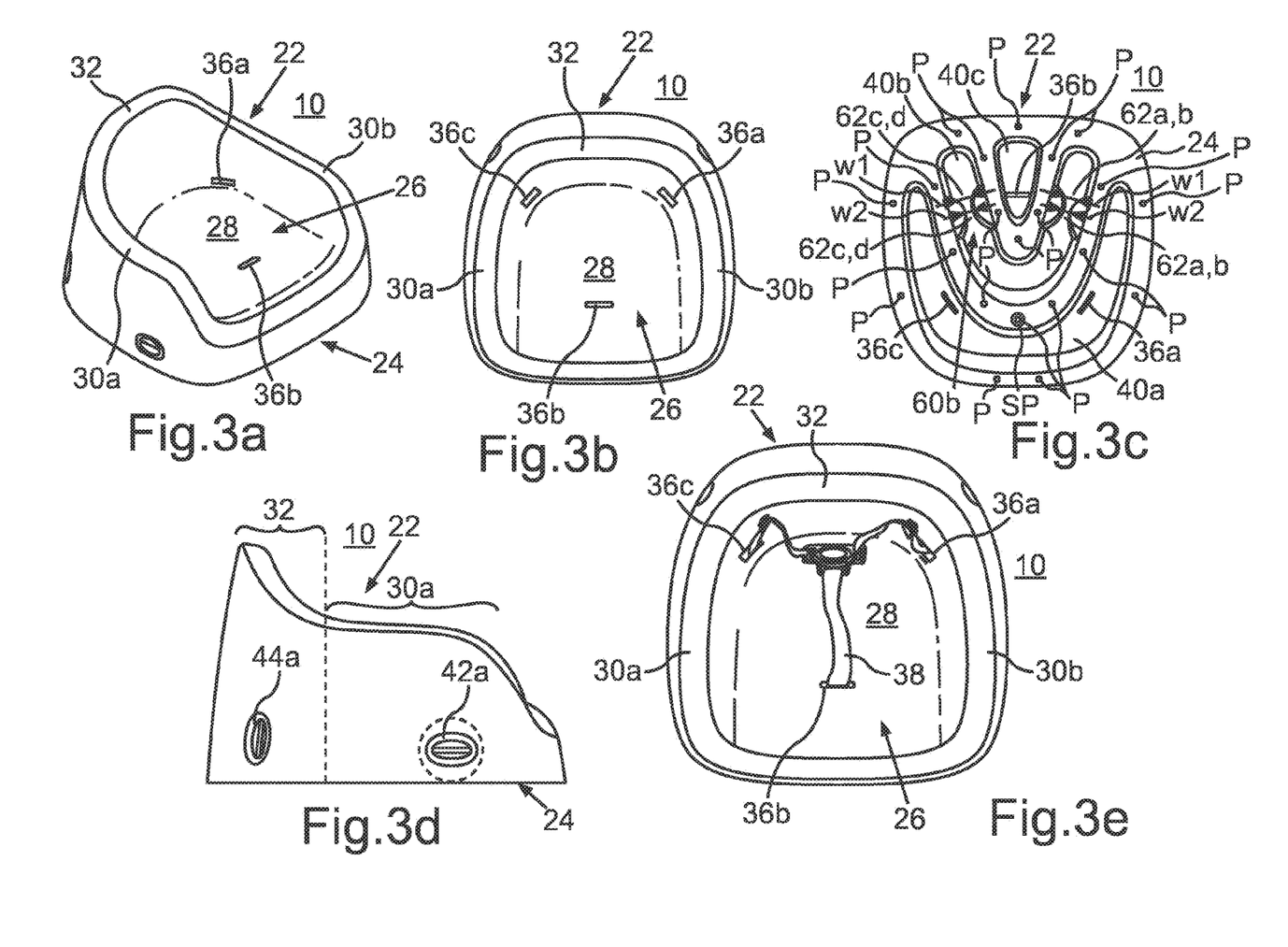

FIG. 3 shows different representations of an embodiment of a booster seat 10 according to the invention. It includes a seat shell 22, which comprises a bottom side 24 for supporting the seat shell 22 on a seat, for example a chair, and a top side 26, on which a supporting surface 28 as well as sidewalls 30*a*, 30*b* laterally bounding it and a backrest area 32 are provided. The backrest area 32 can also be configured only as a back area, that is lower than in the representation of FIG. 3. In the representations of FIGS. 3*a*, 3*b* and 3*c*, slots 36*a*, 36*b*, 36*c* for attaching a three-point belt are apparent, wherein FIG. 3*e* shows the representation of FIG. 3*b* with mounted three-point belt 38.

As can be taken from 3*c*, the bottom side 24 of the seat shell 22 has a stacking structure, which is matched to provide a stacking ability to the top side 26 of the seat shell 22 shown in FIG. 3*a*, FIG. 3*b* and FIG. 3*d*. For this purpose, an enclosed recess 40*a* is provided, which can at least partially receive the backrest area 32 as well as the sidewalls areas 30*a*, 30*b* of a further booster seat 10 of the same type. In this manner, multiple booster seats 10 according to the invention can be stacked on top of each other in engaging manner and thereby in particularly stable manner.

Moreover, an enclosed recess 40*b* as well as a further enclosed recess 40*c* is apparent on the bottom side 24 of the seat shell 22. The slots 36*a* and 36*c* are arranged in the area of the recess 40*a*, the slot 36*b* is arranged in the area of the recess 40*c*. This results in the fact that the corresponding fixings of the three-point belt 38 in the recesses 40*a*, 40*c* do not interfere in stacking multiple booster seats 10 according to the invention on top of each other. The importance of the recess 40*b* will be elaborated in more detail below. The enclosed recesses 40*a*, 40*b*, 40*c* can also be referred to as cavities or enclosed material recesses. Therein, the enclosed recesses 40*a*, 40*b*, 40*c* are preferably arranged in areas, which are different from an area, in which the center of gravity SP of the seat shell 22 is located. Thus, the center of gravity SP is preferably in an area of the seat shell 22 filled with material, and in an area of the seating surface 28, whereby deflection is prevented when a child sits on the seating surface 28.

As is best seen from the representation of FIG. 3*d*, an eyelet 42*a* is arranged in the front exterior area of the sidewall 30*a*. An eyelet 44*a* is arranged in the lateral exterior area of the backrest area 32. Corresponding eyelets 42*b*, 44*b* are arranged on the other side of the seat shell 22 not visible in FIG. 3*d* symmetrical hereto.

Figure 4:
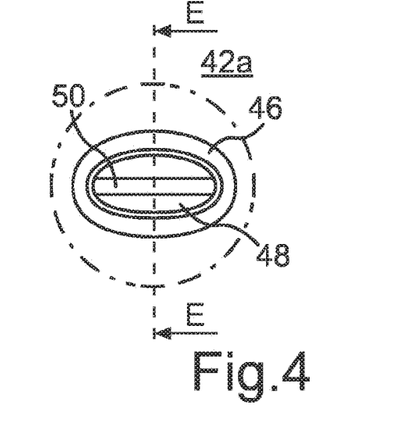
FIG. 4 a detailed view of the section D of. 3*d;*

FIG. 4 shows an enlarged representation of the section D of FIG. 3*d*. It is apparent that an eyelet 42, 44 includes an eyelet trough 46 with a rounded interior area 48. The eyelet 42, 44 furthermore comprises a retaining web 50, wherein the eyelets 42 are oriented such that the associated retaining web 50 extends horizontally, while the eyelets 44 are oriented such that the retaining web 50 extends substantially vertically.

Figure 5:
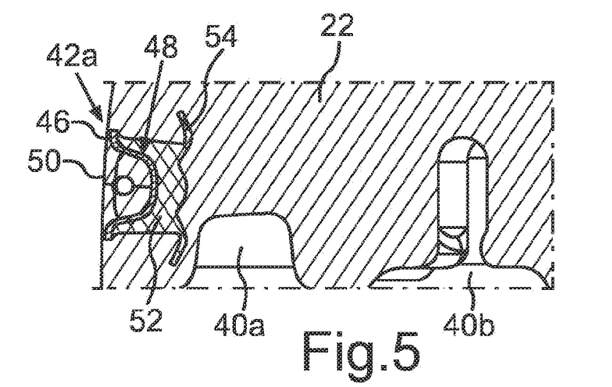
FIG. 5 a cross-sectional representation along the section E-E of FIG. 4.
Figure 6:
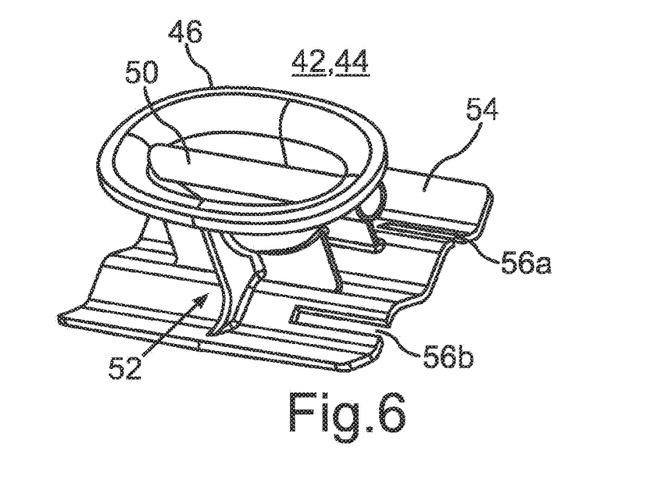
FIG. 6 a perspective view of an embodiment of the eyelet along with eyelet trough, web and retaining anchor.

FIG. 5 shows a cross-sectional view along the section E-E of FIG. 4. Not only the enclosed recesses 40*a*, 40*b*, but also the eyelet 42*a* along with eyelet trough 46, rounded interior area 48 and retaining web 50 are shown. Moreover, it is apparent that the eyelet 42*a* comprises a web 52, which is coupled to the eyelet trough 46 on oneside and on the other side to a retaining anchor 54 for retaining the eyelet 42*a* in the seat shell 22. According to FIG. 6, the web 52 includes a plurality of individual webs, presently 6 individual webs in total, wherein an extension plane of two of the individual webs extends perpendicular to extension planes of the four other individual webs. Thereby, the eyelet trough 46 of the eyelet 42*a* is particularly well supported on the retaining anchor 54. The construction of the eyelet 42*a* is characterized by particularly high stability with minimum weight. As can be taken from the representation of FIG. 5, the respective eyelet 42, 44 along with web 52 and retaining anchor 54 is positively accommodated in the seat shell 22.

Returning to FIG. 6, a more accurate representation of the eyelet 42, 44 along with web 52 and retaining anchor 54 can be taken from it. As shown, the retaining anchor 54 is formed wave-shaped in cross-section. Moreover, it comprises multiple slots 56, the slots 56*a*, 56*b* of which are visible, which extend parallel to the respective retaining web 50 of the eyelet 42, 44. The material thickness of the retaining anchor 54 is selected such that it can uniformly distribute a tensile stress on the retaining web 50 in the seat shell 22, which is formed of a foamed molded part, due to its wave-shaped structure, without damaging or pulling out the material of the seat shell 22.

Figure 7A:
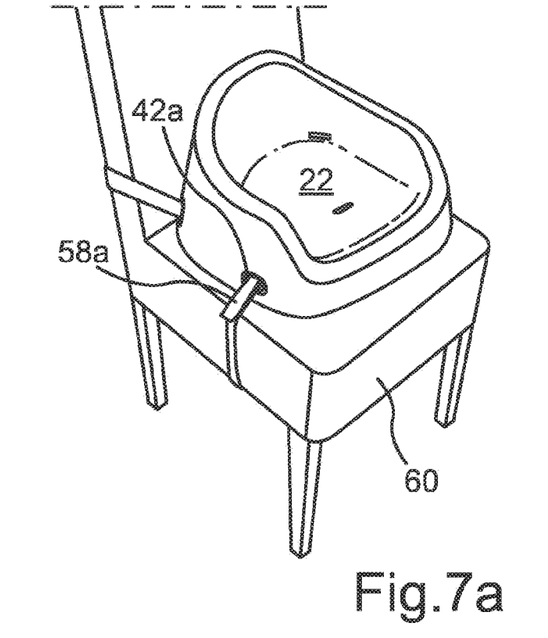
FIG. 7 an embodiment of a booster seat according to the invention mounted on a chair by corresponding fixing by means of two retaining belts.
Figure 7B:
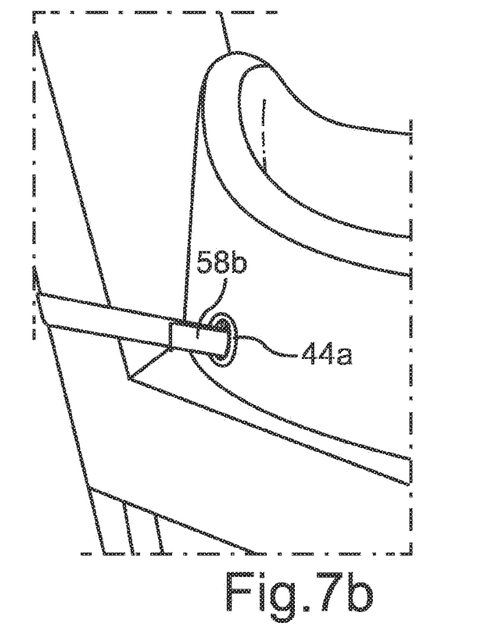

Furthermore, two retaining belts 58*a*, 58*b* are associated with the booster seat 10 of FIG. 3, wherein the seat shell 22 is fixed to the seating surface of a chair 60 by means of the eyelets 42*a*, 42*b* and the retaining belt 58*a* (see FIG. 7), while the seat shell 22 is fixed to the backrest of the chair 60 by means of the eyelets 44*a*, 44*b* and the retaining belt 58*b*.

The enclosed recess 40*b*, see FIG. 3*c*, serves to receive the retaining belts 58*a*, 58*b*. Therein, two clamping devices 60*a*, 60*b* are formed into the bottom side **24* of the seat shell 22 within the recess 40*b*, wherein each clamping device 60*a*, 60*b* comprises exterior areas 62*a*, 62*b* and 62*c*, 62*d*, respectively, which have a larger width W1 than an interior area 64*a*, 64*b*, the width of which is denoted by W2. As is apparent from the representation of FIG. 3*c*, the transition between the areas 62*a*, *b* and 64*a* on the one hand and 62*c*, *d* and 64*b* on the other hand is formed rounded. The clamping devices 60*a*, 60*b* serve as a storage location and as a transport securing device for the retaining belts 58*a*, 58*b*.

Preferably, the seat shell 22 is formed of polyurethane.

Figure 8A:
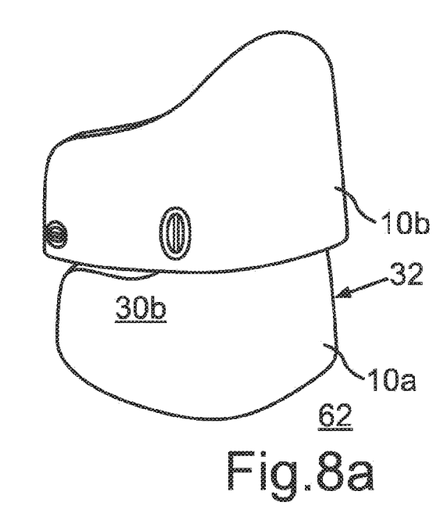
Figure 8B:
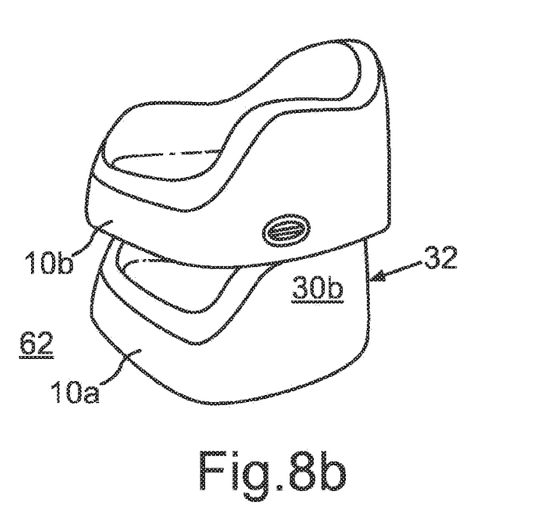

FIGS. 8*a* and 8*b* show two booster seats 10 according to the invention stacked on top of each other. As is apparent, a belt system with eyelets 42, 44 and retaining belts 58 can be, but does not have to be provided. As is apparent from FIG. 8*a*, 8*b*, the sidewalls 30*a*, 30*b* of a first booster seat 10*a* as well as the backrest area 32 thereof are received by separate enclosed recesses or a common enclosed recess 40*a* in the bottom side 24 of a second booster seat 10*b*. The spatial orientation of the booster seat 10*b* is the same as of the booster seat 10*a* directly arranged on a support 62.

The retaining belts 58*a*, 58*b* are accommodated in the recess 40*b* of the respective booster seat 10*a*, 10*b*. Thereby, the stackability is not impaired and the retaining belts 58*a*, 58*b* do not otherwise appear in an interfering manner.

If such a booster seat 10*a*, 10*b* includes a three-point belt 38 (see FIG. 3*e*), this does not impair the stackability since it is arranged in a depression of the top side 26 of the seat shell 22. The fixings of the three-point belt 38 to the bottom side of a booster seat 10 are also in the area of recesses and thereby either do not interfere.

Figure 9:
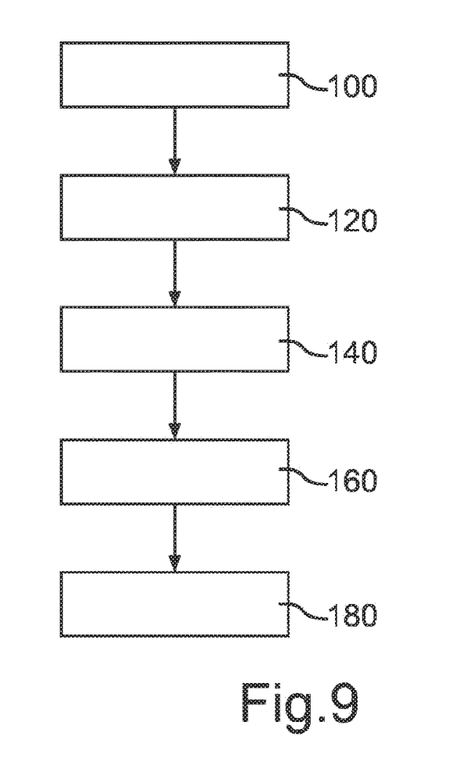
FIG. 9 a signal flowchart for illustrating an embodiment of the method according to the invention.

FIG. 9 shows a signal flowchart for an embodiment of a method according to the invention. Therein, a negative mold of a seat shell 22 is provided in step 100, which comprises a bottom side 24 for supporting the seat shell 22 on a seat and a top side 26, on which a seating surface 28 as well as sidewall and back areas 30a, 30b, 32 laterally and rearward bounding it are provided. In a step 120, a first and a second eyelet 42a, 42b each with a retaining web 50 are positioned in the front exterior area of the respective sidewall 30a, 30b relative to the negative mold. In step 140, a third and a fourth eyelet 44a, 44b each with a retaining web 50 are positioned in the rear exterior area of the respective sidewall 30a, 30b or in the lateral exterior area of the back area 32 relative to the negative mold. The steps 120 and 140 can also be carried out in reverse order.

Finally, in step 160, a plastic foam, in particular polyurethane, is filled into the negative mold for forming the seat shell 22 with fixing the first, second, third and fourth eyelets 42a, 42b, 44a, 44b. Therein, the plastic, in particular polyurethane, is first filled into the negative mold and subsequently foamed. In order that the gas used for foaming can again escape from the negative mold, the negative mold comprises holes or gas channels. They are arranged on the part of the negative mold forming the bottom side 24 of the seat shell 22, in particular in an area which is different from the area of the negative mold forming the at least one recess 40a, 40b, 40c in the bottom side 24 of the seat shell 22. Therein, the positions of these holes or channels in the negative mold correspond to the positions of the bottom side 24 of the seat shell 22 denoted by P from FIG. 3c. In a step 180, the seat shell, along with the eyelets 42a, 42b, 44a, 44b formed and fixed into the plastic molded part, is removed from the negative mold.

What is claimed is:

1. A booster seat including a seat shell, the booster seat comprising a bottom portion for supporting the seat shell on a seat, and a top portion having a seating surface, with sidewalls and a rear area bounding the seating surface,
   the booster seat further comprising at least one first belt system for fixing the seat shell to the seat, wherein the first belt system includes a first, a second, a third and a fourth eyelet with respective retaining web as well as a first and a second retaining belt, wherein the first and the second eyelet are associated with the first retaining belt and the third and the fourth eyelet are associated with the second retaining belt,
   wherein the first and the second eyelet are arranged in the front exterior area of respective sidewalls,
   wherein the third and the fourth eyelet are arranged in the rear exterior area of respective sidewalls or in lateral exterior areas of the back area, and
   wherein the seat shell is formed as a foamed molded part, in which the respective eyelets are accommodated, wherein each eyelet comprises a web which is coupled to an eyelet trough on one side and to a retaining anchor for retaining the eyelet in the foamed molded part on another side.

2. The booster seat according to claim 1,
   wherein the first and the second eyelet are arranged such that the respective retaining web is horizontally oriented in a use position of the booster seat, and wherein the third and the fourth eyelet are arranged such that the respective retaining web is vertically oriented in the use position of the booster seat.

3. The booster seat according to claim 1,
   wherein at least one of the eyelet troughs of the first, second, third, or fourth eyelet includes an interior rounded area.

4. The booster seat according to claim 1,
   wherein at least one of the first eyelet and second eyelet along with the respective web and the respective retaining anchor is positively accommodated in the foamed molded part.

5. The booster seat according to claim 1,
   wherein the retaining anchor of the first eyelet is wave-shaped in cross-section.

6. The booster seat according to claim 1,
   wherein the retaining anchor of the first eyelet comprises at least one slot which extends parallel to the respective web of the first eyelet.

7. The booster seat according to claim 1,
   wherein the first and the second retaining belt each comprise a hook and loop fastener.

8. The booster seat according to claim 1,
   wherein the bottom portion of the seat includes at least a first recess for receiving the first retaining belt and a second recess for receiving the second retaining belt.

9. The booster seat according to claim 8,
   wherein the first recess comprises a first clamping device for clamping the first retaining belt and the second recess includes a second clamping device for clamping the second retaining belt.

10. The booster seat according to claim 9,
    wherein the seat shell is formed as a foamed molded part, and wherein the first and the second clamping device are molded into the foamed molded part.

11. The booster seat according to claim 9,
    wherein the first and the second clamping device each include at least one first area with a first width (W1) and at least one second area with a second width (W2), wherein the first width (W1) is larger than the second width (W2).

12. The booster seat according to claim 11,
    wherein each clamping device comprises a transitional area from the first area to the second area, and wherein the transitional area is rounded.

13. The booster seat according to claim 1,
    wherein the bottom portion of the seat includes a common recess for receiving the first retaining belt and the second retaining belt.

14. The booster seat according to claim 1,
    wherein the booster seat further includes a second belt system for retaining an occupant in the seat shell.

15. A method for producing a booster seat, the method comprising:
    a) providing a negative mold of a seat shell, the mold configured to form a bottom side of the booster seat for supporting the seat shell and a top side of the booster seat, the top side comprising a seating surface as well as first and second sidewalls laterally bounding the seating surface, and a back area laterally and rearwardly bounding the seating surface,
    b) positioning a first eyelet having at least a first retaining web within the negative mold in a front exterior area configured to form the first sidewall and positioning a second eyelet with at least a second retaining web within the negative mold in a front exterior area configured to form the second sidewall, and
    positioning a third eyelet with at least a third retaining web within the negative mold in a rear exterior area configured to form a portion of the first sidewall or a lateral area of the back area or in the lateral exterior area of the back area and positioning a fourth eyelet with at least a fourth retaining web within the negative mold in a rear exterior area configured to form a portion of the first sidewall or a lateral area of the back area; and c) filling a plastic foam into the negative mold for forming the seat shell and fixing the first, second, third and fourth eyelets within the seat shell.

* * * * *